United States Patent [19]

Lewis, Jr.

[11] Patent Number: 4,658,285
[45] Date of Patent: Apr. 14, 1987

[54] VIDEO SIGNAL NOISE REDUCTION APPARATUS

[75] Inventor: Henry G. Lewis, Jr., Hamilton Square, N.J.

[73] Assignee: RCA Corporation, Princeton, N.J.

[21] Appl. No.: 782,128

[22] Filed: Sep. 30, 1985

[51] Int. Cl.⁴ .................. H04N 9/64; H04N 5/213
[52] U.S. Cl. ................................. 358/36; 358/31
[58] Field of Search ..................... 358/36, 167, 31

[56] References Cited

U.S. PATENT DOCUMENTS

| | | | |
|---|---|---|---|
| 4,240,106 | 12/1980 | Michael et al. | 358/36 |
| 4,246,610 | 1/1981 | Takahashi | 358/36 |
| 4,268,855 | 5/1981 | Takahashi | 358/36 |
| 4,275,418 | 6/1981 | Trump et al. | 358/167 |
| 4,291,333 | 9/1981 | Warnock et al. | 358/36 |
| 4,296,436 | 10/1981 | Achiha | 358/167 |
| 4,339,803 | 7/1982 | Michael et al. | 364/724 |
| 4,361,853 | 11/1982 | Remy et al. | 358/167 |

FOREIGN PATENT DOCUMENTS 2083318  3/1982  United Kingdom ............... 358/167

Primary Examiner—John W. Shepperd
Attorney, Agent, or Firm—E. M. Whitacre; P. J. Rasmussen; E. P. Herrmann

[57] ABSTRACT

A recursive filter for noise reducing composite video signal separately processes the luminance and chrominance components of the composite signal but requires only a single frame of storage. Input composite video signal is separated into luminance and chrominance component signals. The component signals are coupled to separate signal recursion scaling/combining circuits. The outputs from the recursion circuits are summed in an adder to produce noise-reduced composite video signal which is applied to a frame delay element. The output of the delay element is applied to a chroma/luma separator which separates the luminance and chrominance components and applies them to the respective recursion circuits.

4 Claims, 4 Drawing Figures

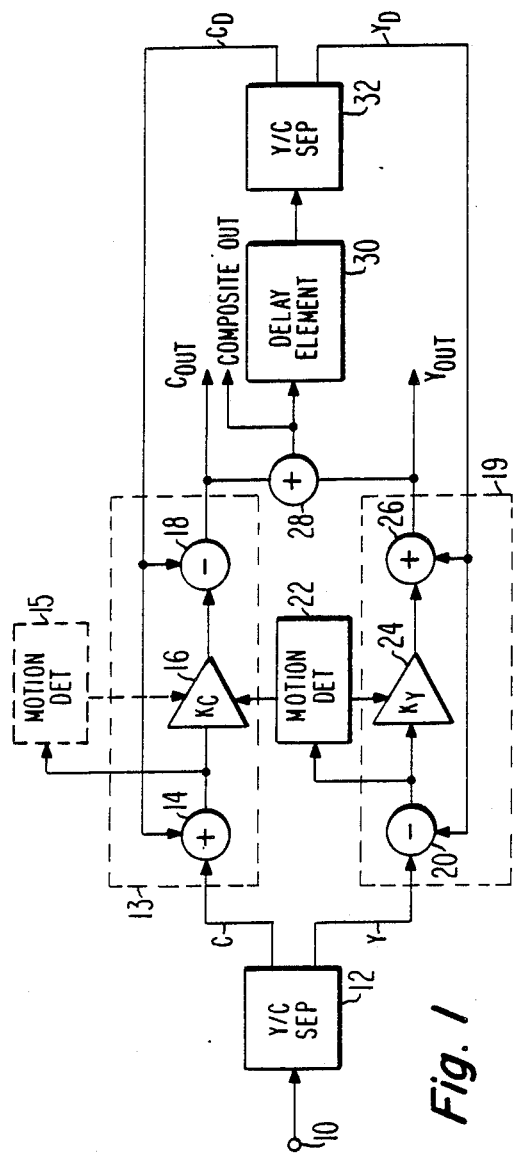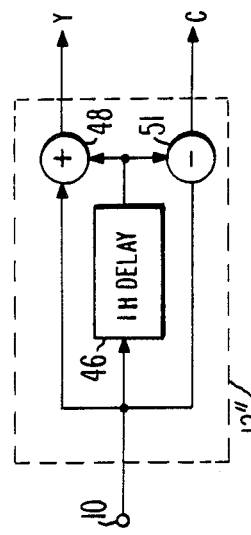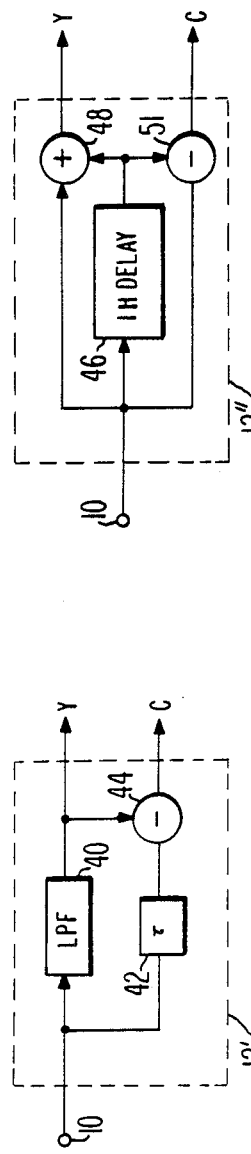

VIDEO SIGNAL NOISE REDUCTION APPARATUS

This invention relates to recursive filter circuitry for enhancing the signal-to-noise ratio of video signals.

BACKGROUND OF THE INVENTION

It is well known in the video signal processing arts that the signal-to-noise ratio of video signals can be enhanced by recursive filtering. Recursive filtering is the process of integrating a portion of current video signal with a complementary portion of video signals from previous frames or fields of video signals. A typical recursive filter includes a storage element for delaying substantially one field/frame of video signals, a subtracter, a scaler and an added. Current video signal, and delayed video signal from the storage element are applied to respective input ports of the subtracter. The differences output by the subtracter are coupled to the scaler which weights the differences by a coefficient, the value of which is dependent on interscene content. The weighted differences and delayed video signal from the storage element are combined in the adder to produce noise reduced video signal which is applied to the input port of the storage element.

Recursive filtering may be performed on component video signals or on composite video signals. If the process is performed on component video signals, i.e., on luminance signal and chrominance signals separately, using known recursive filters significantly more storage circuitry is required than if the process is performed on composite video signals. On the other hand, if the process is performed on composite video signals, the phase of the chrominance signal of either the current or delayed composite signal must be inverted before the current and delayed signals are combined. In this latter mode a single scaling circuit is employed to weight the composite signal differences resulting in like integration of the luminance and chrominance components of the composite signal.

Michale et al. in U.S. Pat. No. 4,240,106 recognized that it is advantageous to recursively process luminance and chrominance components with different weighting factors because viewer sensitivity to noise differs for the noise in different bands of the video signal frequency spectrum.

It is an object of the present invention to provide a recursive filter which separately processes the luminance and chrominance components of composite video but which requires a storage element no larger than storage elements required for recursively filtering composite video signals.

SUMMARY OF THE INVENTION

The present invention includes a first Y/C separator for separating the luminance and chrominance components of incoming composite video signal and a second Y/C separator for separating the luminance and chrominance components of delayed video signal. A first signal combining means is coupled to the first and second Y/C separators for combining the incoming and delayed luminance components in a desired ratio to produce a noise reduced luminance signal. A second combining means is coupled to the first and second Y/C separators for combining the incoming and delayed chrominance components to produce a noise reduced chrominance signal. A signal summer is coupled to the first and second combining means for adding the noise reduced luminance and chrominance signal to develop a noise reduced composite signal. The noise reduced composite signal is applied to a storage element for providing the delayed video signal.

BRIEF DESCRIPTION OF THE DRAWINGS

FIG. 1 is a block diagram of a recursive filter embodying the present invention.

FIGS. 2 and 3 are block diagrams of alternative Y/C separation circuits which may be implemented in the FIG. 1 circuitry.

DETAILED DESCRIPTION

Figure 4:
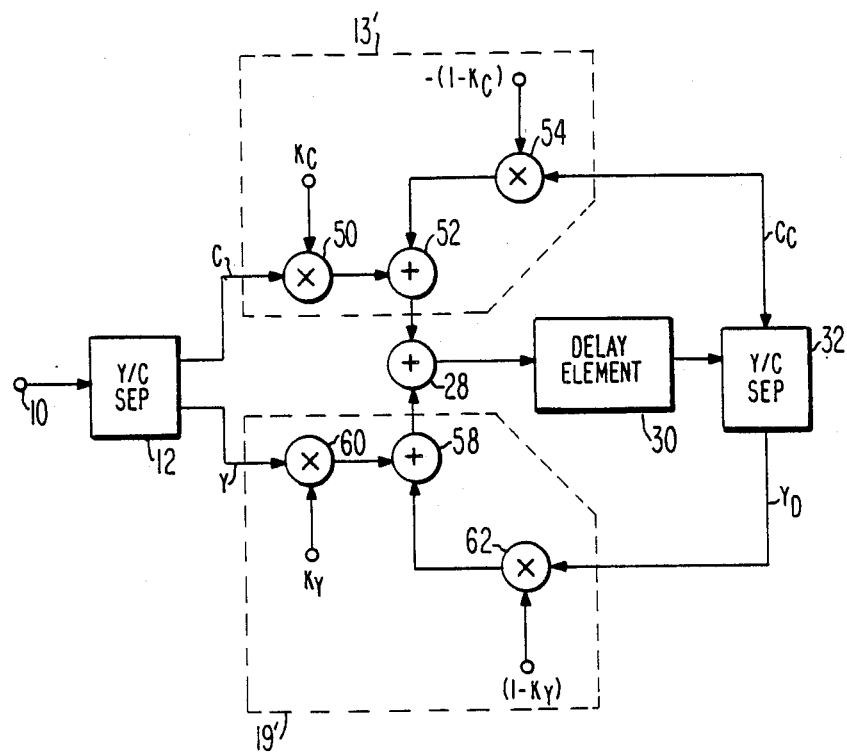
FIG. 4 is a block diagram of an alternate embodiment of the FIG. 1 recursive filter.

In the various figures, elements designated with the same numbers correspond to identical or functionally similar circuits. The invention may be practiced on either analog signals or digital representations of analog signals with the appropriate choice of circuit elements. As such, the invention will be described in terms of general functional circuit elements.

Referring to FIG. 1, composite video signal to be processed for noise reduction/signal-to-noise enhancement is applied to terminal 10. The composite signal is coupled to a chroma/luma separator 12 which produces chrominance component signals, C, and luminance component signals, Y. The chrominance and luminance component signals are coupled to scaling/combining circuits 13 and 19 respectively. Delayed chrominance and luminance component signals from chroma/luma separator 32 are coupled to second input connections of scaling/combining circuits 13 and 19 respectively. The scaling/combining circuits 13 and 19 effectively combine the delayed and non-delayed component signals in predetermined proportions to produce noise reduced component signals Cout and Yout. The noise reduced signals are applied to an adder circuit 28 which produces noise-reduced composite signals that are applied to the input connection of a delay element 30. Delay element 30 delays the composite signal applied to its input connection by an interval corresponding to substantially a field period or an integral number of field periods. Delayed composite signal from delay element 30 is coupled to the chroma/luma separator 32 which produces the delayed chrominance and luminance component signals.

If FIG. 1 is configured as a frame recursive filter the signal delay provided by delay element 30 is designed so that the delayed and non-delayed component signals applied to adder 14 and subtractor 20 correspond to the same picture elements (pixels) in succeeding video frames. In addition, the respective delayed component signals and scaled signals from scaling circuits 16 and 24 applied to subtractor 18 and adder 26 correspond to like pixels from succeeding video frames. In order to satisfy both conditions, compensating delay elements may be required to be inserted between the chroma/luma separator 32 and subtractor 18 and adder 26 respectively. One skilled in the art of signal processing will readily recognize these requirements and know to provide such timing compensation.

If the FIG. 1 circuit is configured as a field recursive filter, delay element 30 will be designed such that the delayed and non-delayed signals correspond to substantially like pixels from succeeding fields. Exemplary circuitry for performing composite signal field recursive filtering is described in detail in U.S. patent application Ser. No. 751,681 filed July 3, 1985 and entitled "Apparatus For Noise Reducing Composite Video Signal".

The scaling/combining circuits 13 and 19 are exemplary of numerous circuits which may be implemented to perform the recursion algorithm. Briefly, the circuitry 19 functions as follows. Delayed luminance $Y_D$ is subtraced from incoming luminance Y in subtractor 20. The luminance differences are applied to the scaling circuit 24 which weights the differences by a weighting coefficient $K_Y$. Delayed luminance $Y_D$ is then added to the weighted luminance differences in adder 26 to produce noise reduced output luminance $Y_O$. The output luminance $Y_O$ is described by the equation:

$$Y_O = K_Y Y + (1 - K_Y) Y_D. \qquad (1)$$

The value of $Y_D$ is equal to the value $Y_O$ produced one frame interval earlier and can be described in Z transform notation $$Y_D = Y_O Z^{-\tau} = (K_Y Y + (1 - K_Y) Y_D) Z^{-\tau}. \qquad (2)$$

Expanding equation (1) by successively substituting $Y_D$ for equation (2) in equation (1)

$$Y_O = K_Y Y + K_Y Y (1 - K_Y) Z^{-\tau} + K_Y Y (1 - K_Y)^2 Z^{-2\tau} + K_Y Y (1 - K_Y)^3 Z^{-3\tau} + \qquad (3)$$

If there is no interframe image motion, equation (3) converges to $$Y_O = Y K_Y (1/(1-(1-K_Y)) = Y \qquad (4)$$

Thus, the output luminance signal equals the input luminance signal.

Noise components occurring in the luminance signal, however, do not add linearly but rather sum according to the squares of the RMS noise value. It can be shown that the RMS noise output $N_O$ attendant the luminance out put in reduced by the factor $\sqrt{K_Y/(2-K_Y)}$, i.e., $$N_O = N_{RMS} \sqrt{K_Y/(2 - K_Y)} . \qquad (5)$$

The scaling/combining circuit 13 is similar to circuit 19 except that the adder and subtractor are interchanged. The interchange accounts for the 180° phase change of the chrominance component from frame-to-frame. With the 180° chrominance phase difference the adder 14 functions as a subtracter and the subtractor functions as an adder.

Typically it is not desirable to recurse the signals when interframe image motion occurs. Therefore, motion detectors are included in the recursion circuitry to vary the weighting coefficients when motion occurs. In FIG. 1 a single motion detector, 22, responsive to the interframe luminance difference signal from subtractor 20, generates the weighting coefficients $K_C$ and $K_Y$ for both the chrominance and luminance caling circuits respectively. In an alternative embodiment, separate motion detection-scale factor generating circuitry may be provided for the separate signals. This is indicated by the motion detector 15 drawn in phantom. Exemplary motion detectors may be found in U.S. Pat. No. 4,275,418.

Circuitry for separating the luminance and chrominance components from composite video is illustrated in FIGS. 2 and 3. The FIG. 2 circuitry is perferred when the luminance component may be occupy the entire standard luminance bandwidth such as occurs in the recovered composite signal from many VTR's. The FIG. 3 circuitry will provide full band luminance but requires more total circuitry.

In FIG. 2, composite video is applied to a filter 40 which attenuates signals in the band of frequencies normally occupied by the chrominance component and produces luminance signals, Y, occurring in the band of frequencies below the chrominance band. The composite video signals are also coupled to one input of a subtractor 44, through a delay element 42 which compensates for the group delay of filter 40. The filtered luminance signals are coupled to a second input of subtractor 44 wherein the luminance component is subtracted from composite video signal to produce the chrominance component C.

The FIG. 3 chroma/luma separator 12" is a line comb filter. In FIG. 3 composite video signal is coupled to the input of a one horizontal line delay element 46, and respective inputs of adder 48 and subtracter 51. Delayed composite video signal from delay element 46 is coupled to respective second input terminals of adder 48 and subtracter 51. In adder 48, in-phase signal components, i.e. luminance, sum constructively, and antiphase components, i.e. chrominance, cancel to produce the luminance signal Y. In subtracter 51 in-phase signal components cancel and antiphase components sum constructively to produce the chrominance component C. It will be appreciated that either the signals applied to the adder 48 and subtracter 51 or the signals from the adder 48 and subtracter 51 will be halved to normalize the Y and C signals.

FIG. 4 illustrates another embodiment of a composite signal recursive filter. The FIG. 4 circuit is similar to the FIG. 1 circuit, except for the scaling/combining circuitry. The scaling/combining circuitry 13' and 19' performs a similar algorithm to the circuitry 13 and 19 of FIG. 1. In FIG. 4, luminance signal from chroma/luma separator 12 is coupled to the scaling circuit 60 wherein it is weighted by the luminance scaling coefficient $K_Y$. Delayed luminance signal from the chroma/luma separator 32 is applied to the scaling circuit 62 wherein it is weighted by the factor $(1-K_Y)$. The scaled luminance and the delayed and scaled luminance signals from scaling circuits 60 and 62 are coupled to respective input terminals of adder 58, which produces the noise reduced luminance signal. The luminance signal, $Y_O$, produced by adder 58 is described by the equation:

$$Y_O = K_Y Y + (1 - K_Y) Y_D \qquad (6)$$

which is identical to equation (1).

The chrominance scaling/combining circuitry 13' is similar to the luminance scaling/combining circuitry 19' with the exception that the delayed chrominance is weighted by a negative factor $-(1-K_C)$, where $K_C$ is the chrominance weighting coefficient. A negative weighting factor $-(1-K_C)$ is used here to account for the antiphase relationship between current and delayed chrominance signals. The weighting factors $K_Y$, $(1-K_Y)$, $K_C$ and $-(1-K_C)$ may be constants or they may be variable in response to image motion detection as in the FIG. 1 embodiment.

The invention may also be practiced in, for example, a color video camera system which develops composite video signals. In this instance, the current luminance and chrominance components are available as separate signals, and the chroma/luma separator 12 is not required. The separate chrominance and luminance signals from the camera processing circuitry are applied directly to the scaling/combining circuits 13 and 19 respectively. Composite video signal produced by the camera is formed in adder 28.

What is claimed is:

1. Apparatus for recursive filtering composite video signal comprising:
   means for providing separated incoming luminance and chrominance signals;
   first and second scaling/combining circuits having respective first input terminals coupled to said means for providing, having respective second input terminals and respective output terminals;
   means coupled to the output terminals of said first and second scaling/combining circuits for adding signals produced thereby to produce composite video signal;
   a delay element for delaying signal by at least substantially one field interval, having an input terminal coupled to said means for adding, and having an output terminal; and
   a chroma/luma separator coupled to said delay element output terminal, and having first and second output terminals respectively coupled to second input terminals of the first and second scaling/combining means, wherein said first scaling/combining means receives chrominance signals from said means for providing and said chroma/luma separator and said second scaling/combining means receives luminance signals from said means for providing and said chroma/luma separator.

2. The apparatus set forth in claim 1 wherein said means for providing includes:
   a source of composite video signals;
   a further chroma/luma separator having an input terminal coupled to said source of composite video signals and having first and second output terminals for producing chrominance and luminance signals respectively.

3. The apparatus set forth in claim 1 wherein said first and second scaling/combining means each combine incoming and delayed signals in predetermined proportions.

4. Recursive filter circuitry for enhancing the signal-to-noise ratio of a video signal comprising:
   an input terminal for applying said video signal;
   first filter means coupled to said input terminal, and having a plurality of output terminals, for providing at respective ones of said plurality of output terminals, signals occupying substantially exclusive portions of the frequency spectrum of said video signal;
   a plurality of scaling/combining circuits having respective first input terminals coupled respectively to ones of said plurality of output terminals, and having respective second input terminals, for combining signals applied to said first and second input terminals in predetermined ratios;
   means coupled to said plurality of scaling/combining circuits for summing signals produced thereby to produce a combined recursively filtered video signal;
   a delay element coupled to said means for summing, for delaying said combined video signal by at least substantially one field interval;
   second filter means, having an input coupled to said delay element and having a plurality of output terminals for providing at respective ones of said plurality of output terminals, signals occupying substantially exclusive portions of the frequency spectrum of delayed combined video signal, the frequency bands occupied by respective ones of the signals provided by said second filter means substantially corresponding to frequency bands of respective ones of signals provided by said first filter means; and
   respective means for coupling the output terminals of said second filter means to respective second input terminals of said plurality of scaling/combining means wherein the signals applied to the first and second input terminals of each of said scaling/combining circuits occupy substantially similar frequency bands.

* * * * *